United States Patent
Nakane et al.

(10) Patent No.: US 7,850,086 B2
(45) Date of Patent: Dec. 14, 2010

(54) SEMICONDUCTOR INTEGRATED CIRCUIT AND NONCONTACT INFORMATION SYSTEM INCLUDING IT

(75) Inventors: George Nakane, Nara (JP); Tatsumi Sumi, Osaka (JP)

(73) Assignee: Panasonic Corporation, Osaka (JP)

( * ) Notice: Subject to any disclaimer, the term of this patent is extended or adjusted under 35 U.S.C. 154(b) by 1114 days.

(21) Appl. No.: 10/590,994

(22) PCT Filed: Apr. 12, 2005

(86) PCT No.: PCT/JP2005/007073

§ 371 (c)(1),
(2), (4) Date: Aug. 29, 2006

(87) PCT Pub. No.: WO2005/101304

PCT Pub. Date: Oct. 27, 2005

(65) Prior Publication Data

US 2007/0188297 A1    Aug. 16, 2007

(30) Foreign Application Priority Data

Apr. 15, 2004 (JP) .............................. 2004-120168

(51) Int. Cl.
  *G06K 19/06* (2006.01)
(52) U.S. Cl. ...................................... 235/492; 340/502
(58) Field of Classification Search ................ 235/492; 340/502, 505, 5.6, 5.64, 5.65, 10.51
See application file for complete search history.

(56) References Cited

U.S. PATENT DOCUMENTS 4,962,485 A   10/1990  Kato et al.
5,449,894 A   9/1995   Bruhnke et al.
6,608,551 B1 *  8/2003  Anderson et al. ......... 340/10.51
2005/0258940 A1 * 11/2005  Quan ........................ 340/10.3

FOREIGN PATENT DOCUMENTS

| JP | 8-77318 A | 3/1996 |
| JP | 10-207580 A | 8/1998 |
| JP | 2000-250661 A | 9/2000 |

(Continued)

OTHER PUBLICATIONS

European Search Report issued in European Patent Application No. 05730561.7, mailed Jun. 16, 2009.

*Primary Examiner*—Thien M Le
(74) *Attorney, Agent, or Firm*—McDermott Will & Emery LLP (57) ABSTRACT

The present invention extends the reading range between a contactless type information medium (semiconductor integrated circuit) and a reader/writer, which exchanges data in contactless communications with the contactless type information medium, and enables a stable data exchange even if the power supply voltage is lowered when data is returned from the contactless type information medium to the reader/writer. Specifically, when data is returned from the contactless type information medium, the data to be returned is held in the logic circuit section 200 capable of operating at a lower voltage than the non-volatile memory circuit section 300, and the reset detection lower limit voltage to be used by the reset generating circuit 160 during the data-returning period is set to be lower than that during periods other than the data-returning period.

15 Claims, 8 Drawing Sheets

FOREIGN PATENT DOCUMENTS

| | | |
|---|---|---|
| JP | 2001-250097 A | 9/2001 |
| JP | 2002-252568 A | 9/2002 |
| JP | 2002-23366 A | 1/2003 |
| WO | WO 00/05673 | 2/2000 |
| WO | WO 00/16277 | 3/2000 |
| WO | WO 01/84489 A1 | 11/2001 |
| WO | WO 2004/013806 A1 | 2/2004 |

* cited by examiner

SEMICONDUCTOR INTEGRATED CIRCUIT AND NONCONTACT INFORMATION SYSTEM INCLUDING IT

RELATED APPLICATIONS

This application is the U.S. National Phase under 35 U.S.C. §371 of International Application No. PCT/JP2005/007073, filed on Apr. 12, 2005, which in turn claims the benefit of Japanese Application No. 2004-120168, filed on Apr. 15, 2004, the disclosures of which Applications are incorporated by reference herein.

TECHNICAL FIELD

The present invention relates to a semiconductor integrated circuit to which power is supplied via electromagnetic waves, and an information system (contactless type information system) including a contactless type information medium including such a semiconductor integrated circuit.

BACKGROUND ART

Recently, data carriers such as contactless IC cards, which are capable of transmitting and receiving data while receiving power supply at the same time by using a semiconductor integrated circuit to which power is supplied via electromagnetic waves of a predetermined wavelength utilizing the mutual induction between coils, have reached the stage of practical application. Contactless IC cards are classified into the close-coupled type, the proximity type and the vicinity type based on the reading range between the contactless IC card and the reader/writer, which is a device for exchanging radio waves with the contactless IC card. The standard specification for each type is being fully prepared.

Particularly, proximity type contactless IC cards, which can be used over a distance of up to about 10 [cm] from the reader/writer, are often used in applications such as train passes, with which the ticket gate can be opened and closed based on the contactless exchange of information with the reader/writer, wherein the users do not need to take their train passes (contactless IC cards) out of the train pass holders at the ticket gate, or the like. Thus, contactless IC cards and information systems (contactless type information systems) using the same can potentially be used in a very wide variety of applications.

When data is returned from a contactless IC card to a reader/writer, for example, in such a contactless type information system, the load of a magnetically-coupled coil (antenna coil) of the contactless IC card is varied to modulate the signal (data), thus realizing the return of data.

In a contactless type information system, if the voltage caused by the mutual induction between coils drops when exchanging data due to, for example, the physical distance between the contactless IC card and the reader/writer being excessive, it may disable communications between the contactless IC card and the reader/writer. Therefore, conventional contactless IC cards ensure accurate data communications by resetting the internal semiconductor integrated circuit when the power supply voltage becomes lower than a predetermined reset detection lower limit voltage. (See, for example, Patent Document 1.)

Patent Document 1: Japanese Laid-Open Patent Publication No. 8-77318

DISCLOSURE OF THE INVENTION

Problems to be Solved by the Invention

However, where the signal is modulated by varying the load of the antenna coil, the voltage through the antenna coil temporarily drops during the period in which data is being returned from the contactless IC card to the reader/writer, even if the physical distance between the contactless IC card and the reader/writer is not excessive.

Thus, with a conventional contactless IC card, when the physical distance between the contactless IC card and the reader/writer exceeds a certain distance or when data is returned to the reader/writer, thereby lowering the voltage through the antenna coil so that the power supply voltage is lower than the reset detection lower limit voltage, the semiconductor integrated circuit in the contactless IC card may constantly be reset even in the middle of a data exchange, thus failing to exchange data between the contactless IC card and the reader/writer.

In view of the problem, an object of the present invention is to provide a contactless type information medium with which it is possible to extend the reading range between the contactless type information medium (semiconductor integrated circuit) and a reader/writer, which exchanges data in contactless communications with the contactless type information medium, and to enable a stable data exchange even if the power supply voltage is lowered when data is returned from the contactless type information medium to the reader/writer.

Means for Solving the Problems

In order to achieve the object, the present invention relates to a semiconductor integrated circuit, to which a power supply voltage is supplied via electromagnetic waves received by an antenna coil, and which exchanges data via the antenna coil, the semiconductor integrated circuit comprising:

a memory circuit storing data;

a pair of terminals to which the antenna coil is connected;

a modulating-transmitting circuit for transmitting data via the antenna coil by varying a load between the terminals according to data to be transmitted;

a transmission control circuit for outputting data stored in the memory circuit to the modulating-transmitting circuit; and a reset signal generating circuit for outputting a reset signal for resetting the transmission control circuit to the transmission control circuit when the power supply voltage decreases below a predetermined threshold value, wherein:

the transmission control circuit is configured to output a transmission status signal, which indicates that data is being transmitted; and the reset signal generating circuit is configured so that the threshold value is lower during a period in which the transmission status signal is being output than during a period in which the transmission status signal is not being output.

Thus, the power supply voltage (reset detection lower limit voltage) for which the reset signal is output is changed based on whether data is being transmitted. Therefore, by connecting the semiconductor integrated circuit to a coil (antenna coil) transmitting/receiving electromagnetic waves of a predetermined frequency to/from a contactless type information medium (contactless IC card), it is possible to extend the reading range between the contactless IC card and a reader/ writer, which supplies the power supply voltage to, and exchange data with, the contactless IC card via electromagnetic waves, and to enable a stable data exchange.

The present invention also relates to a semiconductor integrated circuit, wherein the reset signal generating circuit includes a voltage-dividing resistor for dividing the power supply voltage and is configured so as to output the reset signal when a voltage obtained by the voltage division by the voltage-dividing resistor is lower than a predetermined reference voltage.

The present invention also relates to a semiconductor integrated circuit, wherein the reset signal generating circuit is configured to change a voltage division ratio so that the voltage obtained by the voltage division is higher during a period in which the transmission status signal is being output than during a period in which the transmission status signal is not being output.

The present invention also relates to a semiconductor integrated circuit, wherein:
the voltage-dividing resistor is a series of resistors including three or more resistors; and
the reset signal generating circuit is configured to change the voltage division ratio by changing the number of transistors of the series of resistors for dividing the power supply voltage.

Thus, it is possible to change the number of resistors of the voltage-dividing resistor to thereby switch the reset detection lower limit voltage from one to another with a simple circuit configuration without increasing the circuit scale.

The present invention also relates to a semiconductor integrated circuit, wherein the transmission control circuit is configured to output the transmission status signal while simultaneously outputting data stored in the memory circuit to the modulating-transmitting circuit.

Thus, before the power supply voltage decreases below the reset detection lower limit voltage, the reset detection lower limit voltage can be switched to be low.

The present invention also relates to a semiconductor integrated circuit, wherein the transmission control circuit includes a buffer for holding data stored in the memory circuit and is configured to output data held in the buffer to the modulating-transmitting circuit.

Thus, data to be transmitted is held in the transmission control circuit, whereby the memory circuit is not activated when the data is transmitted. Specifically, a transmission control circuit, which typically includes only logic gates, is capable of operating at a lower voltage than a memory circuit, which includes not only logic gates but also memory cells, etc. Therefore, even if the reset detection lower limit voltage is lowered during a period in which data is being transmitted, it is possible to extend the reading range between the contactless IC card and the reader/writer and to enable a stable data exchange.

The present invention also relates to a semiconductor integrated circuit, wherein the transmission control circuit is configured to stop outputting the transmission status signal after an amount of time greater than or equal to an amount of time required for outputting data to the modulating-transmitting circuit has elapsed since completion of the data output to the modulating-transmitting circuit.

Thus, it is possible to prevent a reset signal from being output inadvertently, when the power supply voltage rises late due to the internal capacitance of the semiconductor integrated circuit being large, after the data transmission is completed.

The present invention also relates to a semiconductor integrated circuit, further comprising a high-voltage side reset signal generating circuit for outputting, to the transmission control circuit, a reset signal for resetting the transmission control circuit when the power supply voltage exceeds a predetermined threshold value,
wherein the high-voltage side reset signal generating circuit is configured so that the threshold value is lower during a period in which the transmission status signal is being output than during a period in which the transmission status signal is not being output.

The present invention also relates to a semiconductor integrated circuit, wherein the high-voltage side reset signal generating circuit includes a voltage-dividing resistor for dividing the power supply voltage and is configured to output the reset signal when a voltage obtained by the voltage division by the voltage-dividing resistor is higher than a predetermined reference voltage.

The present invention also relates to a semiconductor integrated circuit, wherein the high-voltage side reset signal generating circuit is configured to change a voltage division ratio so that the voltage obtained by the voltage division during a period in which the transmission status signal is being output is higher than that during a period in which the transmission status signal is not being output.

The present invention also relates to a semiconductor integrated circuit:
the voltage-dividing resistor is a series of resistors including three or more resistors; and
the high-voltage side reset signal generating circuit is configured to change the voltage division ratio by changing the number of transistors of the series of resistors for dividing the power supply voltage.

Thus, the reset signal is output when the power supply voltage becomes higher than a predetermined voltage (reset detection upper limit voltage), and the reset detection upper limit voltage is switched from one to another based on whether data is being transmitted. Therefore, if one attempts to externally supply a power supply voltage to operate the semiconductor integrated circuit, without using predetermined electromagnetic waves, the input voltage needs to always be higher than the reset detection lower limit voltage and lower than the reset detection upper limit voltage so that the reset signal RESET will not be generated. Thus, it is very difficult to operate the semiconductor integrated circuit by externally supplying a power supply voltage. This substantially improves the security of the contactless IC card.

The present invention also relates to a contactless type information system, comprising:
a contactless type information medium including the semiconductor integrated circuit noted above and an antenna coil connected to the semiconductor integrated circuit for transmitting/receiving electromagnetic waves; and
a data transmitting/receiving device for supplying a power supply voltage to, and exchanging data with, the contactless type information medium via electromagnetic waves.

Thus, it is possible to extend the reading range between a contactless type information medium (contactless IC card) and a data transmitting/receiving device (reader/writer), which supplies the power supply voltage to, and exchange data with, the contactless IC card, and to enable a stable data exchange.

Effects of the Invention

According to the present invention, it is possible to extend the reading range between a contactless type information medium (semiconductor integrated circuit) and a reader/writer, which exchanges data in contactless communications with the contactless type information medium, and to enable a stable data exchange even if the power supply voltage is lowered when data is returned from the contactless type information medium to the reader/writer.

DESCRIPTION OF REFERENCE NUMERALS

100 Analog circuit section
110 Rectifier circuit
111 Diode
112 Diode
120 Power supply circuit
130 Clock generating circuit
140 Demodulator circuit
150 Modulator circuit
151 Modulation factor adjusting resistor
152 Modulation transistor
160 Reset generating circuit
161 Inverter
162 Reset detection lower limit voltage setting transistor
163-165 Resistor
166 Reference voltage generating circuit
167 Comparator
200 Logic circuit section
300 Non-volatile memory circuit section
410 Coil terminal
420 Coil terminal
1000 Contactless IC card
1100 Contactless IC card LSI
1200 Antenna coil
1300 Tuning capacitor
2000 Reader/writer
2100 Antenna coil
3000 Host device

BEST MODE FOR CARRYING OUT THE INVENTION

An embodiment of the present invention will now be described with reference to the drawings.

Embodiment 1

Configuration of Contactless IC Card System

Figure 1:
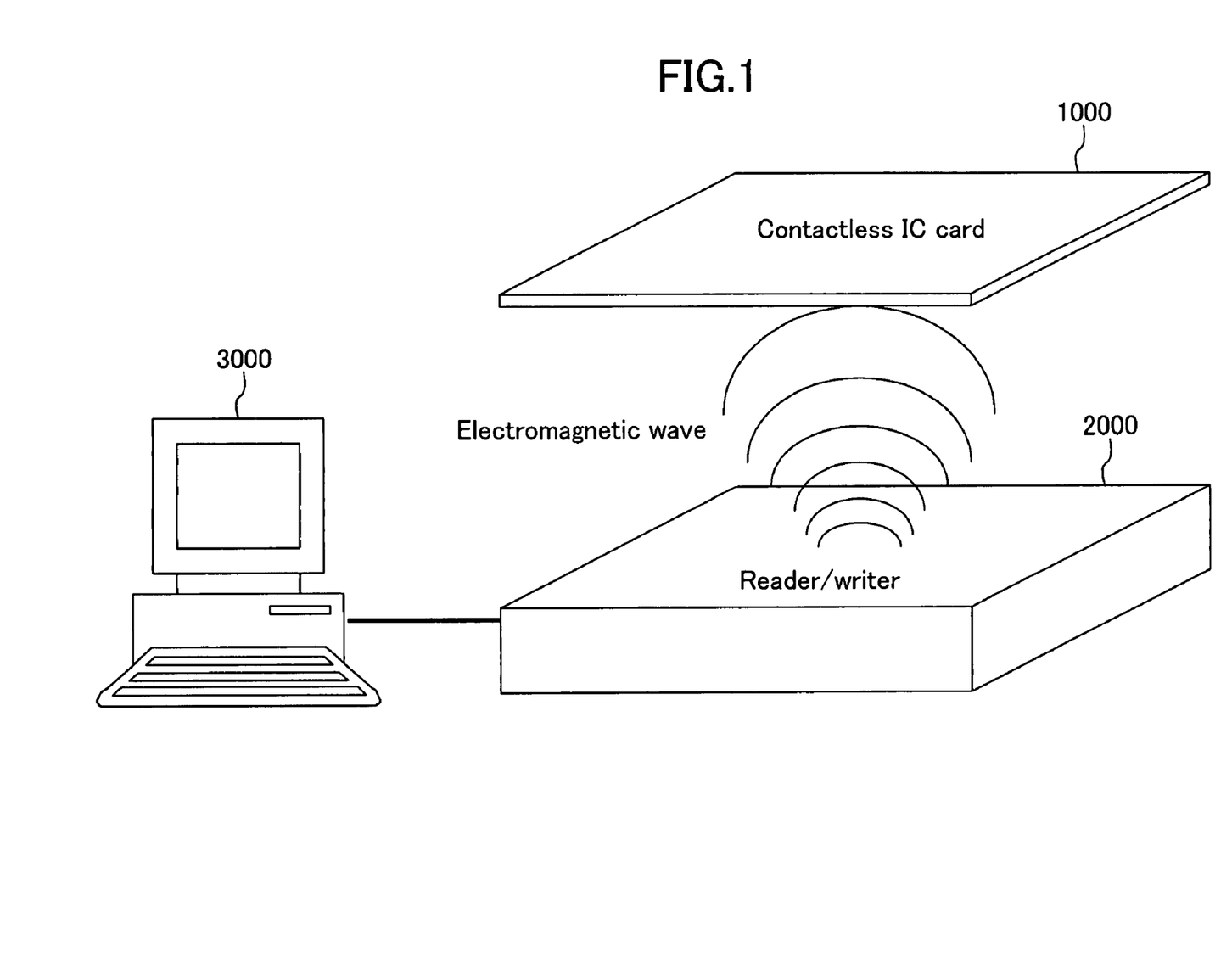
FIG. 1 is a schematic diagram of a contactless IC card system.

FIG. 1 is a block diagram showing the outline of the configuration of a contactless type information system (contactless IC card system) according to Embodiment 1 of the present invention. The contactless IC card system includes a contactless IC card 1000 and a reader/writer 2000. The reader/writer 2000 is connected to a host device 3000, which performs predetermined data processes, for communication with the host device 3000.

In the contactless IC card system having such a configuration, when the contactless IC card 1000 is brought close to the reader/writer 2000, the power supply voltage is supplied via electromagnetic waves, and data can be exchanged therebetween by using electromagnetic waves even in a non-contact state. The data exchange is performed through a protocol in which the reader/writer 2000 transmits data to the contactless IC card 1000 and then the contactless IC card 1000 returns data to the reader/writer 2000. As a result of the data exchange, the reader/writer 2000 can obtain data, such as personal information, stored in the memory of the contactless IC card 1000. If the reader/writer 2000 communicates with the host device 3000 so as to transfer the data obtained by the reader/writer 2000 to the host device 3000, data stored in the contactless IC card 1000 can be used for a wide variety of purposes.

Configuration of Contactless IC Card 1000

Figure 2:
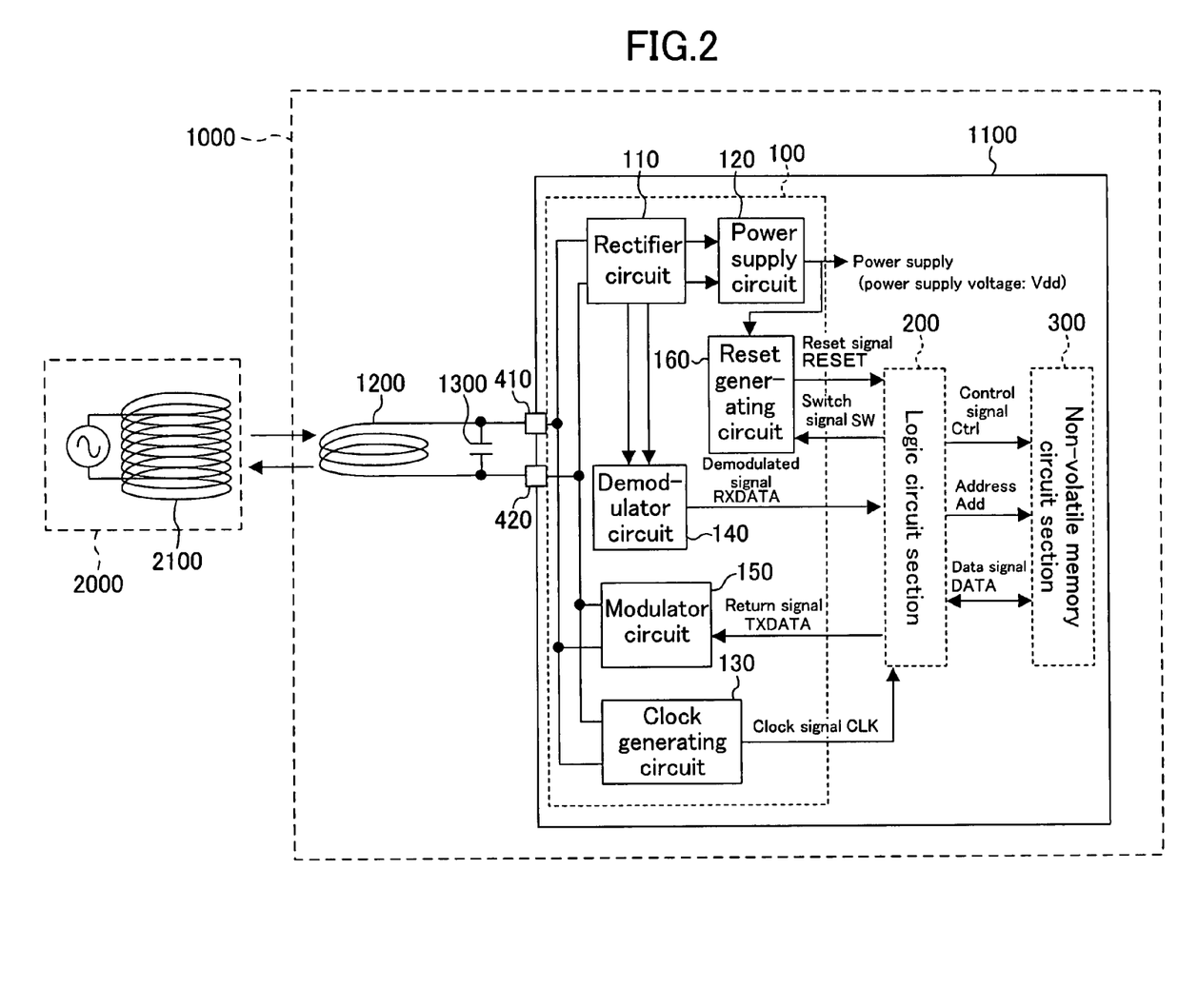
FIG. 2 is a block diagram showing a configuration of a contactless IC card LSI according to an embodiment of the present invention.

The contactless IC card 1000 includes a contactless IC card LSI 1100, an antenna coil 1200 and a tuning capacitor 1300, as shown in FIG. 2, and receives electromagnetic waves output from an antenna coil 2100 of the reader/writer 2000 at the antenna coil 1200, whereby the power supply voltage is supplied to the contactless IC card LSI 1100 via the received electromagnetic waves.

The contactless IC card LSI 1100 includes an analog circuit section 100, a logic circuit section 200, a non-volatile memory circuit section 300 for storing data therein, and coil terminals 410 and 420, as shown in FIG. 2.

The antenna coil 1200 is connected to the coil terminals 410 and 420 of the contactless IC card LSI 1100, and the tuning capacitor 1300 is connected to the antenna coil 1200. Therefore, when the antenna coil 1200 receives electromagnetic waves from the reader/writer 2000, an alternating-current voltage is generated between the coil terminal 410 and the coil terminal 420, and the generated alternating-current voltage is input to the analog circuit section 100.

Configuration of Analog Circuit Section 100

The analog circuit section 100 includes a rectifier circuit 110, a power supply circuit 120, a clock generating circuit 130, a demodulator circuit 140, a modulator circuit 150, and a reset generating circuit 160, as shown in FIG. 2.

Figure 3:
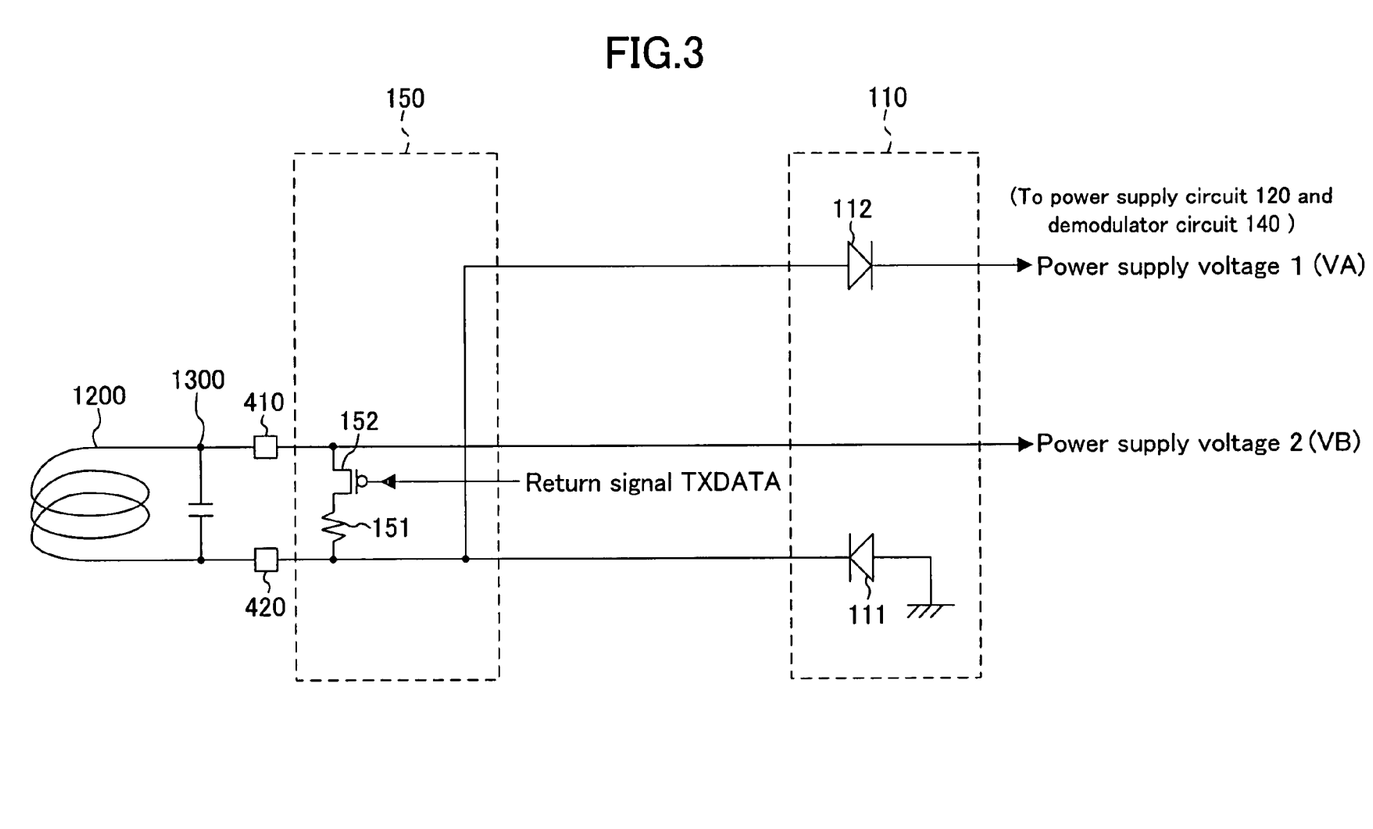
FIG. 3 is a block diagram showing a configuration of a modulator circuit and a rectifier circuit according to an embodiment of the present invention.

As shown in FIG. 3, the rectifier circuit 110 is a voltage doubler rectifier including a diode 111 and a diode 112, which rectifies the alternating-current voltage generated between the coil terminals 410 and 420 into a direct-current voltage and stabilizes the voltage so as to output a power supply voltage Vdd. A voltage doubler rectifier is characteristic in that the value of the rectified voltage is higher than that of other types of rectifier circuits.

The rectifier circuit 110 also outputs the rectified signal (received data signal) to the demodulator circuit 140.

The power supply circuit 120 sends the power supply voltage Vdd, which has been rectified by the rectifier circuit 110, to the entire contactless IC card LSI 1100. This enables the entire contactless IC card LSI 1100 to operate.

The clock generating circuit 130 outputs a clock signal CLK, which is produced by receiving the alternating-current voltage generated between the opposite ends of the antenna coil 1200, to the logic circuit section 200.

The demodulator circuit 140 demodulates the received data signal, and outputs the demodulated signal (demodulated signal RXDATA) to the logic circuit section 200.

Configuration of Modulator Circuit 150

The modulator circuit 150 is a load modulation type modulator circuit, including a modulation factor adjusting resistor 151 and a modulation transistor 152, as shown in FIG. 3, and demodulates a return signal TXDATA from the logic circuit section 200 to output the demodulated signal to the coil terminals 410 and 420. The alternating-current voltage generated between the opposite ends of the antenna coil 1200 (the voltage between the coil terminals 410 and 420) is varied by the modulation transistor 152 and the modulation factor adjusting resistor 151 of the modulator circuit 150. Thus, the load of the contactless IC card 1000 is varied.

The resistance value of the modulation factor adjusting resistor 151 used in the modulator circuit 150 is determined as follows.

Figure 4:
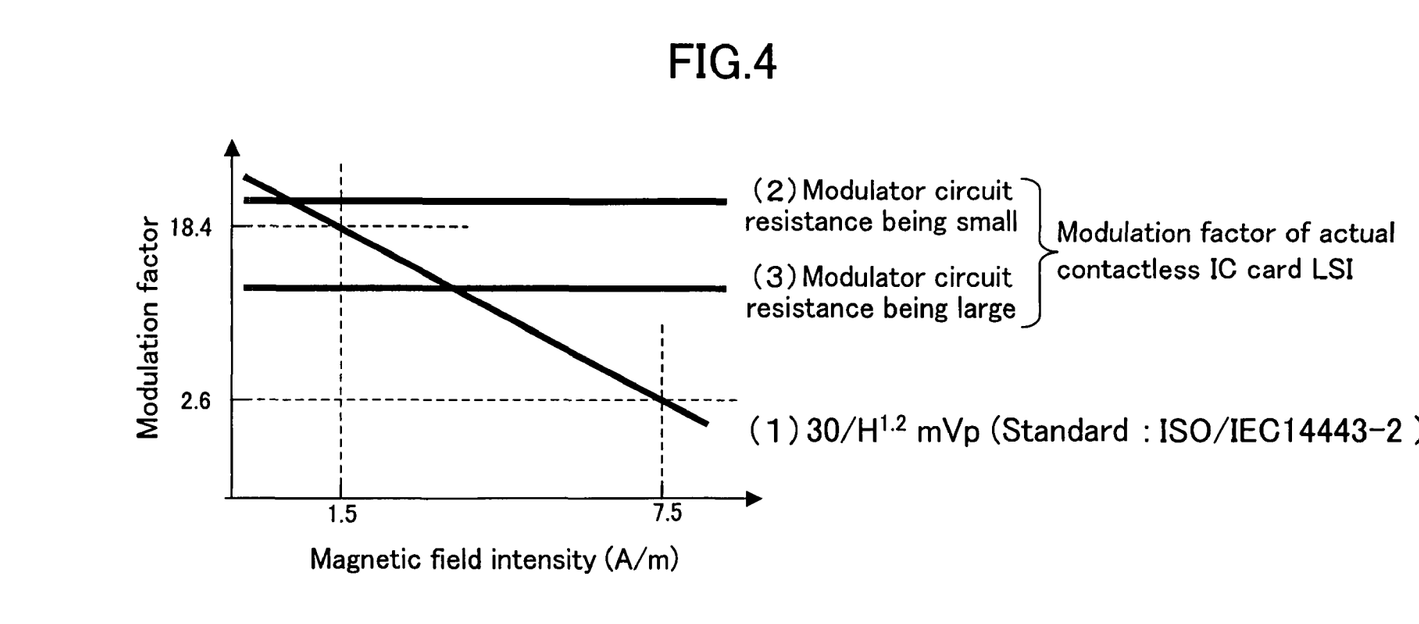
FIG. 4 shows the relationship between the magnetic field intensity and the modulation factor.

Typically, the characteristics of the modulator circuit 150 are represented by the modulation factor, which indicates the data communications capability between the contactless IC card 1000 and the reader/writer 2000, as shown in FIG. 4. The modulation factor needs to satisfy the standard specified in the international standard ISO/IEC 14443-2 regarding contactless IC cards. In order to satisfy the standard, the modulation factor of the modulator circuit 150 needs to be present within the region above the solid line (1) ($30/H^{1.2}$ [mVp]) in FIG. 4. Typically, the weaker the magnetic field intensity is, the smaller the voltage generated in the contactless IC card 1000 is. Therefore, it is necessary to increase the modulation factor in order to enable data communications between the contactless IC card 1000 and the reader/writer 2000.

As indicated by the solid line (2) and the solid line (3) in FIG. 4, the magnitude of the modulation factor is not substantially dependent on the magnetic field intensity, i.e., the voltage generated between the coil terminals 410 and 420, but is dependent on the resistance value of the modulation factor adjusting resistor 151 of the modulator circuit 150. Therefore, by setting the resistance value of the modulation factor adjusting resistor 151 to be smaller than a predetermined value, it is possible to increase the modulation factor to such an extent that it is possible to sufficiently enable data communications between the contactless IC card 1000 and the reader/writer 2000, so as to realize stable data communications, even when the magnetic field intensity is low.

Configuration of Reset Generating Circuit 160

The reset generating circuit 160 compares the threshold value (the reset detection lower limit voltage Vreset) that is switched from one to another by a switch signal SW (a signal that, when being at the High level, indicates a data-returning period where data is being returned from the contactless IC card 1000 to the reader/writer 2000) input from the logic circuit section 200 with the power supply voltage Vdd. If the power supply voltage Vdd is lower than the reset detection lower limit voltage Vreset, the reset generating circuit 160 outputs, to the logic circuit section 200, the reset signal RESET for resetting the logic circuit section 200, being brought from the Low level (the L level) to the High level (the H level). When the power supply voltage Vdd reaches the reset detection lower limit voltage Vreset, the reset generating circuit 160 brings the reset signal RESET from the H level to the L level. The value (Vre1), which is used as the reset detection lower limit voltage Vreset during the period in which the switch signal SW is at the L level (i.e., other than when data is being returned), is set to such a voltage level that the entire contactless IC card LSI 1100 will not undergo an erroneous operation. The value (Vre2), which is used during the period in which the switch signal SW is at the H level (i.e., the data-returning period), is set to such a voltage level that at least the logic circuit section 200 will not undergo an erroneous operation, the voltage level being lower than the power supply voltage Vdd (the voltage between the coil terminals 410 and 420) being lowered due to the return of data (the non-volatile memory circuit section 300 may possibly undergo an erroneous operation at this voltage).

The reset detection lower limit voltage Vreset is switched from one to another depending on whether the current period is a data-returning period, for the following reason.

Figure 5:
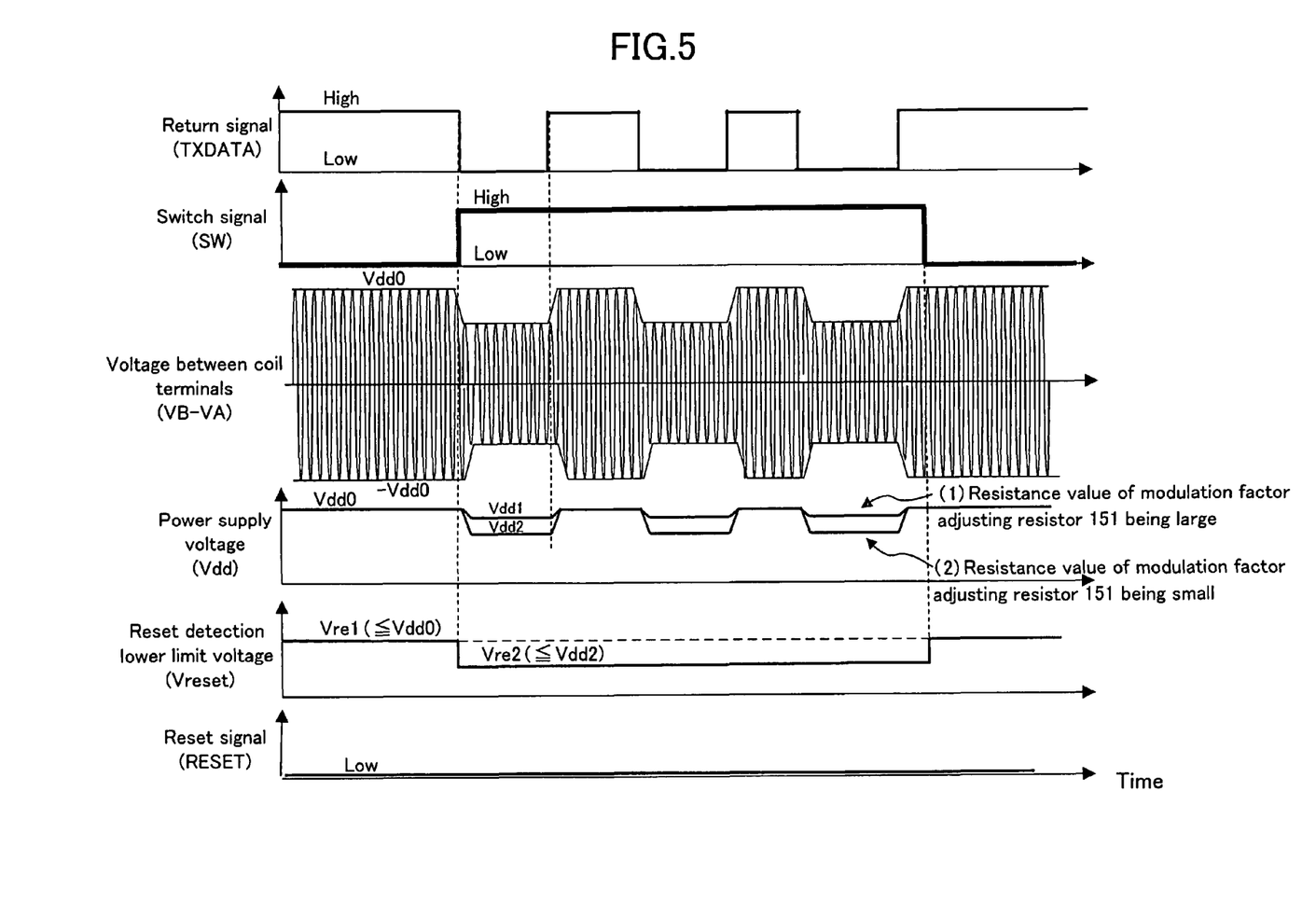
FIG. 5 is a waveform diagram showing the relationship between a return signal TXDATA, the voltage between coil terminals, the power supply voltage, the reset detection lower limit signal, etc.

For example, in the period in which data is being returned from the contactless IC card 1000 to the reader/writer 2000 (when the return signal TXDATA output from the logic circuit section 200 is at the L level), the modulation transistor 152 of the modulator circuit 150 is ON, and the voltage between the coil terminals 410 and 420 decreases. However, when the voltage between the coil terminals 410 and 420 is sufficiently high (e.g., when the contactless IC card 1000 and the reader/writer 2000 are close to each other) or when the resistance value of the modulation factor adjusting resistor 151 of the modulator circuit 150 is sufficiently large, the supplied power is sufficiently high even if the modulation transistor 152 is ON, whereby there is little decrease in the voltage between the coil terminals 410 and 420. For example, during the period in which the return signal TXDATA is at the L level, if the resistance value of the modulation factor adjusting resistor 151 is large, the power supply voltage Vdd decreases from Vdd0 (Vdd0=5.0 V) to Vdd1 (Vdd1=4.5 [V]) as indicated by the straight line (1) in FIG. 5. Therefore, there is little decrease in the power supply voltage Vdd, and if the reset detection lower limit voltage Vreset is set to be lower than Vdd1, the reset signal RESET will not be generated, thereby allowing for data communications between the contactless IC card 1000 and the reader/writer 2000.

As the voltage between the coil terminals 410 and 420 is lower (e.g., as the contactless IC card 1000 and the reader/writer 2000 are more spaced apart from each other) or as the resistance value of the modulation factor adjusting resistor 151 is smaller, it is more likely that the power supply voltage Vdd decreases when the modulation transistor 152 of the load modulation type modulator circuit 150 is turned ON. For example, if the resistance value of the modulation factor adjusting resistor 151 is smaller than a predetermined value, the power supply voltage Vdd decreases from Vdd0 to Vdd2 (Vdd2=3.0 [V]) as indicated by the straight line (2) in FIG. 5. Then, when the reset generating circuit 160 detects the decrease in the power supply voltage Vdd and outputs the reset signal RESET to the contactless IC card LSI 1100, the entire contactless IC card LSI 1100 stops operating. When the operation of the contactless IC card LSI 1100 stops, it is no longer possible to perform data communications between the contactless IC card 1000 and the reader/writer 2000.

Therefore, if the resistance value of the modulation factor adjusting resistor 151 is set to be small, there will be a substantial decrease in the power supply voltage Vdd when the return signal TXDATA sent from the logic circuit section 200 to the modulator circuit 150 is at the L level (where data is returned from the contactless IC card 1000 to the reader/writer 2000), where the magnetic field intensity is low, whereby it may no longer be possible to perform data communications between the contactless IC card 1000 and the reader/writer 2000 if the reset generating circuit 160 outputs the reset signal RESET to the logic circuit section 200.

In summary, when the resistance value of the modulation factor adjusting resistor 151 is smaller, the modulation factor is higher, but the power supply voltage is decreased by a larger amount when data is returned from the contactless IC card 1000 to the reader/writer 2000. When the resistance value of the modulation factor adjusting resistor 151 is larger, the power supply voltage is decreased by a smaller amount when data is returned from the contactless IC card 1000 to the reader/writer 2000, but the modulation factor is smaller where the magnetic field intensity is low.

In order to set the value of the modulation factor adjusting resistor 151 of the modulator circuit 150 to a value such that a sufficient modulation factor can be obtained, so that the reset signal RESET will not be brought to the H level, thus maintaining the state where it is possible to perform data communications between the contactless IC card 1000 and the reader/writer 2000 even if the power supply voltage Vdd is decreased by a large amount, the reset detection lower limit voltage Vreset of the reset generating circuit 160 needs to be decreased below the power supply voltage (Vdd2) of the data-returning period as described above during the period in which data is being returned from the contactless IC card 1000 to the reader/writer 2000.

Specific Configuration of Reset Generating Circuit 160

Figure 6:
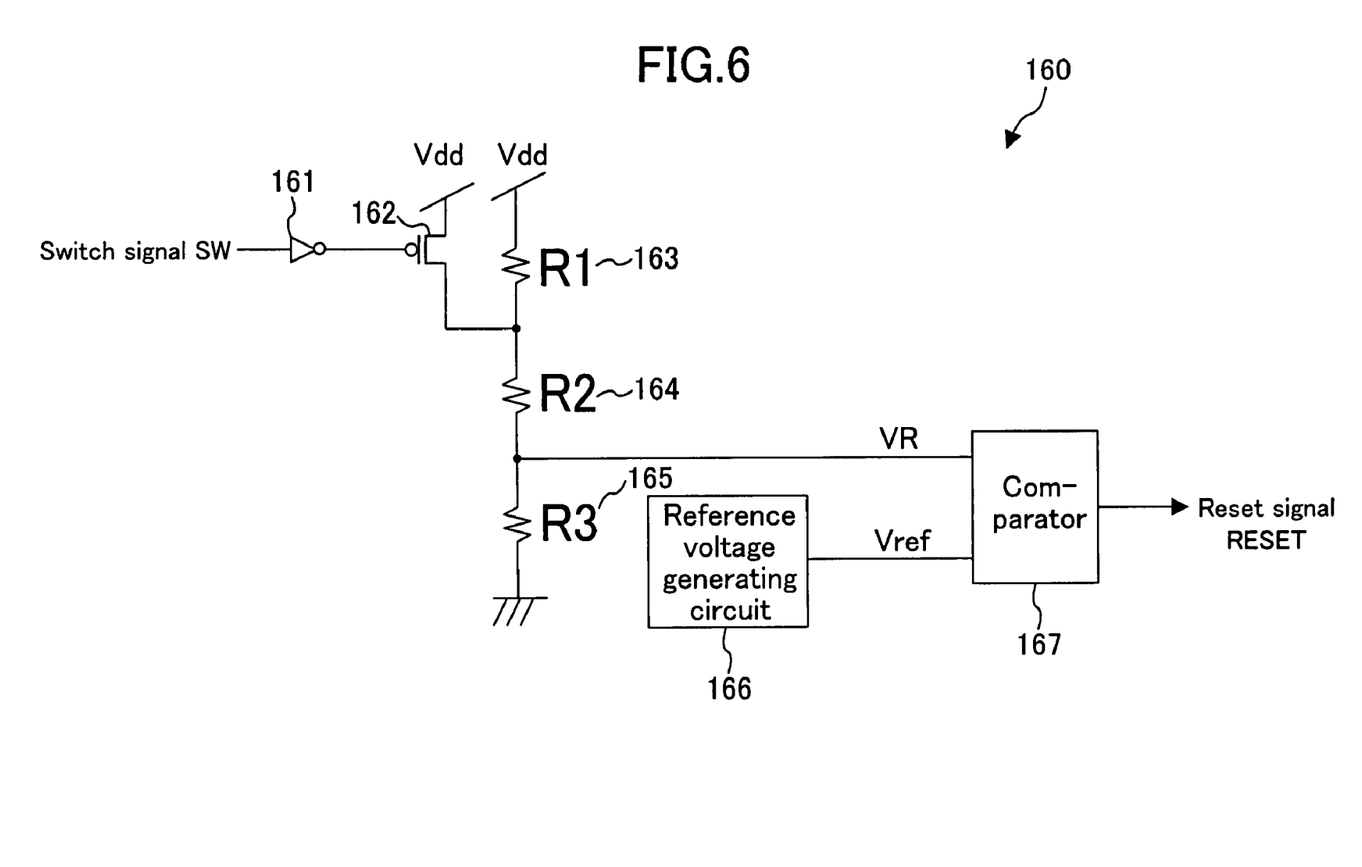
FIG. 6 is a block diagram showing a configuration of a reset generating circuit according to an embodiment of the present invention

Specifically, the reset generating circuit 160 includes an inverter 161, a reset detection lower limit voltage setting transistor 162, resistors 163 to 165, a reference voltage generating circuit 166, and a comparator 167, as shown in FIG. 6.

The inverter 161 inverts the level of the switch signal SW.

The reset detection lower limit voltage setting transistor 162 receives, at the gate terminal thereof, the switch signal SW via the inverter 161, and controls the number of resistors (the resistors 163 to 165) connected together in series for decreasing the power supply voltage Vdd through voltage division. Thus, where the switch signal SW is at the H level, the voltage at the node between the resistor 163 and the resistor 164 is the power supply voltage Vdd.

The resistors 163 to 165 have the resistance values of R1, R2 and R3, respectively, and are provided so as to decrease the power supply voltage Vdd through voltage division.

The reference voltage generating circuit 166 is a circuit for generating a predetermined voltage and is, for example, a bandgap reference voltage generating circuit, or the like. An example where the output voltage Vref of the reference voltage generating circuit 166 is about 1.2 V will be described below.

The comparator 167 compares the voltage VR at the node between the resistor 164 and the resistor 165 with the output voltage Vref of the reference voltage generating circuit 166.

With such a configuration, when the switch signal SW is sent from the logic circuit section 200, the reset generating circuit 160 can increase the voltage VR at the node between the resistor 164 and the resistor 165 to a predetermined voltage to thereby decrease the reset detection lower limit voltage Vreset to a predetermined voltage.

The voltage VR can very easily be set by setting the resistance values of the resistors 163 to 165 to predetermined values. For example, if the reset detection lower limit voltage Vreset (=Vre1) where the switch signal SW is at the L level is 4.5 [V], the reset detection lower limit voltage Vreset (=Vre2) where the switch signal SW is at the H level 3.0 [V], the output voltage Vref of the reference voltage generating circuit 166 is 1.2 V, and R1+R2+R3=1 [MΩ], the resistance values R1, R2 and R3 of the resistors 163 to 165 can obtained by solving the set of simultaneous equations of Expressions 1 to 3 below.

$$R1+R2+R3=1000 \text{ [k}\Omega\text{]} \qquad \text{Exp. 1}$$

$$4.5/(R1+R2+R3)=1.2/R3 \qquad \text{Exp. 2}$$

(the value of the current flowing through the resistor of the reset generating circuit 160 when the switch signal SW is at the L level)

$$3.0/(R2+R3)=1.2/R3 \qquad \text{Exp. 3}$$

(the value of the current flowing through the resistor of the reset generating circuit 160 when the switch signal SW is at the H level)

Based on Expressions 1 to 3 above, the resistance values of the resistors 163 to 165 are as follows: R1=333.33 [kΩ], R2=400.00 [kΩ] and R3=266.67 [kΩ].

Therefore, where the switch signal SW is at the L level, the resistor dividing the power supply voltage Vdd is a series of resistors 163, 164 and 165, whereby the reset detection lower limit voltage Vreset is Vre1=4.5 [V]. When the voltage VR at the node between the resistor 164 and the resistor 165 is lower than 1.2V (i.e., when the power supply voltage Vdd is lower than Vre1=4.5 [V]), the reset signal RESET transitions from the L level to the H level.

When the switch signal SW is at the H level, the resistor dividing the power supply voltage Vdd is a series of resistors 164 and 165, whereby the reset detection lower limit voltage Vreset is Vre2=3.0 [V]. When the voltage VR is lower than 1.2 V (when the power supply voltage Vdd is lower than Vre2=3.0 [V]), the reset signal RESET transitions from the L level to the H level.

In order to set the reset detection lower limit voltage Vreset to be Vre1=4.5 [V] or Vre2=3.0 [V], the resistance values of the resistors 163 to 165 can be set to R1=333.33 [kΩ], R2=400.00 [kΩ] and R3=266.67 [kΩ], respectively, with a circuit configuration as shown in FIG. 6.

Thus, in the reset generating circuit 160, a plurality of resistors are connected together in series, and the number of resistors that decrease the power supply voltage Vdd is controlled by the reset detection lower limit voltage setting transistor 162 based on the state of the switch signal SW. Therefore, the two reset detection lower limit voltages Vre1 and Vre2 can be switched from one to another with a simple circuit configuration without increasing the circuit scale.

Configuration of Logic Circuit Section 200

The logic circuit section 200 outputs the switch signal SW to the reset generating circuit 160 in order to switch the reset detection lower limit voltage Vreset from one to another when data is returned from the contactless IC card 1000 to the reader/writer 2000. Specifically, the logic circuit section 200 outputs the switch signal SW being at the H level in the data-returning period, and outputs the switch signal SW being at the L level in periods other than the data-returning period.

The switch signal SW is brought to the H level simultaneously with the output of data to the modulator circuit 150. Thus, before the power supply voltage decreases below the reset detection lower limit voltage, the reset detection lower limit voltage can be switched to be low.

Figure 7:
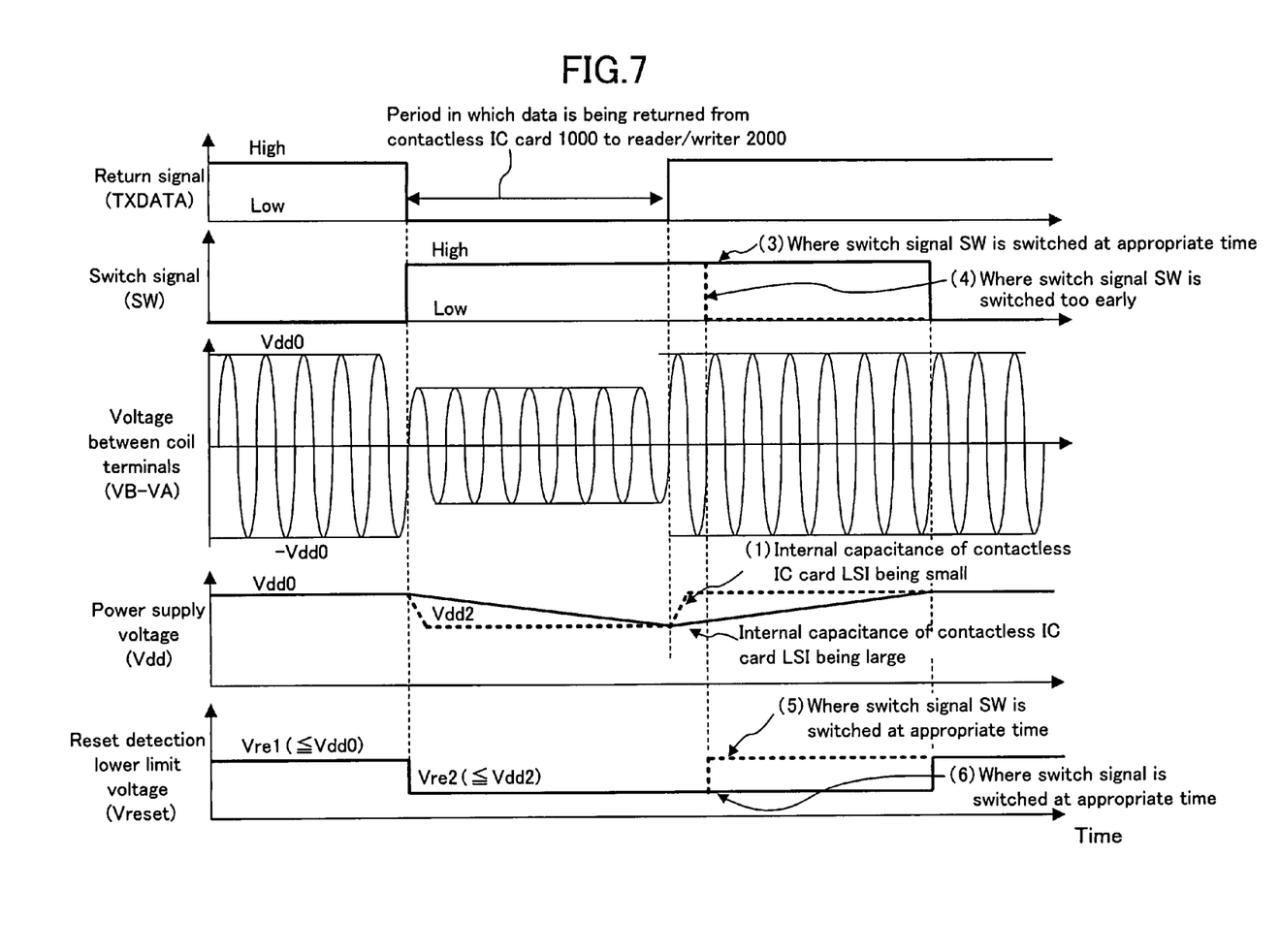
FIG. 7 is a waveform diagram showing the timing for switching a switch signal SW, and variations in the power supply voltage.

When the switch signal SW is brought back from the H level to the L level, the switch signal SW is brought to the L level after the return of data is completed as indicated by the solid line (3) in FIG. 7.

For example, FIG. 7 is an enlarged view showing signal waveforms observed when data is exchanged between the contactless IC card 1000 and the reader/writer 2000. In this example, during the period in which the return signal TXDATA is at the L level, the voltage between the coil terminals 410 and 420 is decreased by the modulator circuit 150 to Vdd2. After the return of data is completed, the return signal TXDATA is brought from the L level to the H level, and the voltage between the coil terminals 410 and 420 increases toward the Vdd0 level, and the power supply voltage Vdd increases from Vdd2 toward Vdd0 along with the voltage increase.

However, the rate at which the power supply voltage Vdd increases varies depending on capacitors parasitically included within the contactless IC card LSI 1100 or capacitors added thereto. Specifically, when the internal capacitance of the contactless IC card LSI 1100 is larger, the power supply voltage Vdd starts increasing slowly when the return of data from the contactless IC card 1000 to the reader/writer 2000 is completed, as indicated by the solid line (2) in FIG. 7.

Therefore, if there is a small time difference between when the switch signal SW sent from the logic circuit section 200 to the reset generating circuit 160 transitions from the H level to the L level and when the return signal TXDATA sent from the logic circuit section 200 to the modulator circuit 150 transitions to the H level, the reset detection lower limit voltage Vreset of the reset generating circuit 160 rises to Vre1, as indicated by the dotted line (5) in FIG. 7, before the power supply voltage Vdd sufficiently returns to the voltage level Vdd0. As a result, the reset generating circuit 160 outputs the reset signal RESET being at the H level, whereby it is no longer possible to perform data communications between the contactless IC card 1000 and the reader/writer 2000. Thus, the logic circuit section 200 needs to delay the fall of the switch signal SW as described above.

However, if the fall of the switch signal SW is delayed excessively, the operation of the non-volatile memory circuit section 300 starts while the contactless IC card LSI 1100 performs the internal operation. Thus, the logic circuit section 200 can delay the fall of the switch signal SW by a period longer than the period in which the return signal TXDATA is at the L level with respect to the rise of the return signal TXDATA sent to the modulator circuit 150 as shown in FIG. 7. Specifically, the modulation frequency is 848 kHz in the international standard "ISO/IEC 14443 Type B" for contactless IC cards, and therefore the fall of the switch signal SW can be delayed by a period greater than or equal to 1.18 [µs/2], i.e., 590 [ns]. Specifically, the logic circuit section 200 is configured so that the switch signal SW transitions with timings as described above by using the clock signal CLK output by the clock generating circuit 130.

The logic circuit section 200 outputs a control signal Ctrl and an address signal Add to the non-volatile memory circuit section 300 so as to read out or write a data signal DATA from or to the specified address.

The logic circuit section 200 performs a reset operation upon transition of the reset signal RESET from the L level to the H level. When the reset signal RESET is at the H level, the logic circuit section 200 does not output the control signal Ctrl to the non-volatile memory circuit section 300. Thus, the logic circuit section 200 cannot access the non-volatile memory circuit section 300. When the reset signal RESET is at the L level, the logic circuit section 200 outputs the control signal Ctrl to the non-volatile memory circuit section 300. The instance of the transition of the reset signal RESET from the H level to the L level is when the access to the non-volatile memory circuit section 300 is allowed. When the access to the non-volatile memory circuit section 300 is being allowed, the logic circuit section 200 can read or write data stored in the non-volatile memory circuit section 300 as described above.

This not only allows an external device such as the reader/writer 2000 to transmit data to the contactless IC card 1000, but also allows data stored in the non-volatile memory circuit section 300 to be returned from the contactless IC card 1000 to the reader/writer 2000.

The logic circuit section 200 buffers data read out from the non-volatile memory circuit section 300 (data to be returned). When data is returned from the contactless IC card 1000 to the reader/writer 2000, the return signal TXDATA, output to the modulator circuit 150, is brought from the H level to the L level to thereby output the buffered data.

When the read-out data is returned, buffered data is used without activating the non-volatile memory circuit section 300 for the following reason.

For example, where no data at all is being exchanged between the contactless IC card 1000 and the reader/writer 2000 and the reset detection lower limit voltage Vreset of the reset generating circuit 160 is lowered to Vre2 (3.0 [V] or less), if the logic circuit section 200 outputs the control signal Ctrl to the non-volatile memory circuit section 300, the non-volatile memory circuit section 300 is activated. The logic circuit section 200 typically includes only logic gates, and operates normally even if the power supply voltage Vdd drops to about 3.0 [V].

However, the non-volatile memory circuit section 300 includes not only logic gates but also memory cells, etc. Therefore, if the non-volatile memory circuit section 300 is activated with the power supply voltage Vdd having dropped to about 3.0 [V], the write time to memory cells of the non-volatile memory circuit section 300, etc., will not be as prescribed, whereby a normal operation is no longer be guaranteed. Thus, the design needs to be such that the non-volatile memory circuit section 300 is not activated when the power supply voltage Vdd drops to about 3.0 [V].

Therefore, in the logic circuit section 200, when data is returned from the contactless IC card 1000 to the reader/writer 2000 as described above, the control signal Ctrl is not output to the non-volatile memory circuit section 300 so as not to activate the non-volatile memory circuit section 300, whereby only the logic circuit section 200 operates to output buffered data to the modulator circuit 150.

Operation of Contactless IC Card System

In the contactless IC card system having such a configuration, data is exchanged as follows. When the contactless IC card 1000 is brought within a predetermined distance from the reader/writer 2000, an alternating-current voltage is generated through the antenna coil 1200 and rectified through the rectifier circuit 110, after which it is output from the power supply circuit 120 as the power supply voltage Vdd so as to be supplied to the entire contactless IC card LSI 1100. Data transmitted from the reader/writer 2000 is received by the antenna coil 1200, input to the demodulator circuit 140 via the rectifier circuit 110, and then demodulated by the demodulator circuit 140.

Data is returned from the contactless IC card 1000 to the reader/writer 2000 as follows. First, the logic circuit section 200 outputs the control signal Ctrl and the address signal Add to the non-volatile memory circuit section 300, thereby reading out data to be returned from the non-volatile memory circuit section 300 and then storing the data in the buffer.

The logic circuit section 200 brings the switch signal SW from the L level to the H level, and lowers the reset detection lower limit voltage Vreset of the reset generating circuit 160 from Vre1 (=4.5 [V]) to Vre2 (=3.0 [V]).

At this time, the logic circuit section 200 brings the control signal Ctrl to the L level so that the non-volatile memory circuit section 300 will not be activated. Then, the logic circuit section 200 outputs the return signal TXDATA, being at the L level, to the modulator circuit 150, whereby the modulation transistor 152 of the modulator circuit 150 is turned ON.

In the present embodiment, during the period in which the return signal TXDATA is at the L level, the coil terminals 410 and 420 are connected together via the modulation factor adjusting resistor 151 and the voltage between the coil terminals 410 and 420 is therefore lowered, but the reset detection lower limit voltage Vreset of the reset generating circuit 160 is switched by the non-volatile memory circuit section 300 to Vre2. Therefore, even if the voltage between the coil terminals 410 and 420 is lowered, the logic circuit section 200 is not reset and data (the return signal TXDATA) is returned to the reader/writer 2000 via the modulator circuit 150.

As described above, in the present embodiment, data to be returned is held in the logic circuit that can operate at a lower voltage than the non-volatile memory circuit section, and the reset detection lower limit voltage is lowered during the data-returning period. Therefore, it is possible to sufficiently increase the modulation factor to extend the reading range between the contactless IC card and the reader/writer, thus realizing a stable data exchange. Thus, the semiconductor integrated circuit of the present invention is useful in the application to contactless IC cards of the proximity type (reading range: 0 to 10 cm) expected to be widespread in the near future.

Variation of Embodiment 1

The contactless IC card LSI 1100 of Embodiment 1 may further include a high voltage-side reset generating circuit obtained by adding, to the reset generating circuit 160, an inverter for inverting the output of the comparator 167.

The switch signal SW is input from the logic circuit section 200 to the high voltage-side reset generating circuit, and the contactless IC card LSI 1100 is configured so as to output the reset signal RESET to the logic circuit section 200.

The high voltage-side reset generating circuit compares the power supply voltage Vdd with the threshold value (the reset detection upper limit voltage V'reset) that is switched from one to another by the switch signal SW input from the logic circuit section 200. If the power supply voltage Vdd exceeds the reset detection upper limit voltage V'reset, the reset signal RESET for resetting the logic circuit section 200 is brought from the L level to the H level and output to the logic circuit section 200. If the power supply voltage Vdd decreases below the reset detection upper limit voltage V'reset, the reset signal RESET is brought from the H level to the L level.

Where the power supply voltage Vdd decreases from Vdd0 to Vdd2 when data is returned from the contactless IC card 1000 to the reader/writer 2000 (during the period in which the return signal TXDATA sent from the logic circuit section 200 to the modulator circuit 150 is at the L level), the value (Vre3) used as the reset detection upper limit voltage V'reset during the period in which the switch signal SW is at the L level (i.e., other than the data-returning period) is set to a voltage level such that Vre3>Vdd0. The value (Vre4) used during the period in which the switch signal SW is at the H level (i.e., the data-returning period) is set to a voltage level such that Vre4>Vdd2.

The two different reset detection upper limit voltages Vre3 and Vre4 can be controlled by setting the values of the resistors 163 to 165 to predetermined values also in the high voltage-side reset generating circuit and by varying the number of resistors to be used for dividing the power supply voltage by the reset detection lower limit voltage setting transistor 162.

Figure 8:
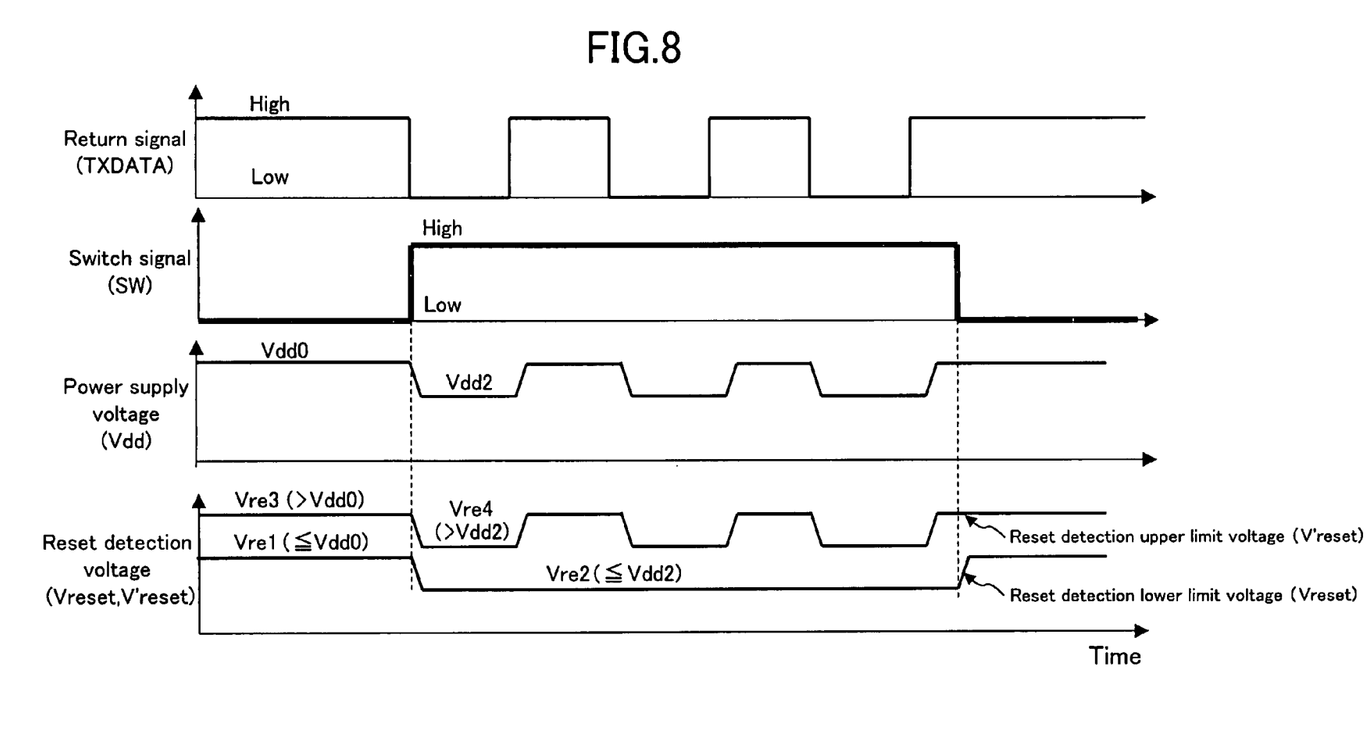
FIG. 8 is a waveform diagram showing the relationship between the return signal TXDATA, the reset detection voltage, etc., according to a variation of an embodiment of the present invention.

As Vre3 and Vre4 are thus controlled, the reset detection upper limit voltage varies as shown in FIG. 8 according to the switch signal SW and the return signal TXDATA.

For example, if a third person attempts, with malicious intent, to externally power the contactless IC card LSI 1100 of this variation to read out, or overwrite, signals inside the contactless IC card LSI 1100 and data stored in the non-volatile memory circuit section 300, the third person needs to externally supply a voltage that can be used in place of the power supply voltage Vdd.

Where a power supply voltage, in place of the power supply voltage Vdd, is externally supplied, the voltage needs to be always higher than the reset detection lower limit voltage Vreset and lower than the reset detection upper limit voltage V'reset so that the reset signal RESET will not be generated.

It is very difficult to have such an external power supply voltage always adjusted so that the reset signal RESET will not be generated. Thus, with the contactless IC card system of this variation, it is easy to substantially improve the security of the contactless IC card LSI 1100 without complicating the circuit configuration of the reset generating circuit 160.

With the reset generating circuit 160 described in the above embodiment, the reset signal RESET at the L level may always be output to the logic circuit section 200 when the switch signal SW is input, instead of determining the two different reset detection lower limit voltages Vre1 and Vre2 as described above. Even with such a configuration, it is possible to maintain data communications between the contactless IC card 1000 and the reader/writer 2000.

The output voltage of the reference voltage generating circuit 166 is merely an example, and the present invention can be used with a circuit that outputs a voltage different from the output voltage as long as the resistors 163 to 165 are set to predetermined values.

While a voltage doubler rectifier is used as the rectifier circuit 110 in the above embodiment, the present invention may use a rectifier circuit that rectifies radio waves by means of a full-wave rectifier circuit or a half-wave rectifier circuit.

While a circuit that modulates the voltage between the coil terminals 410 and 420 is used as the modulator circuit 150 of the above embodiment, it may alternatively be a modulator circuit that modulates the power supply voltage Vdd.

The relationship between each level of each signal and the representation thereof in the above embodiment is merely an example, and the present invention is not limited thereto.

INDUSTRIAL APPLICABILITY

The semiconductor integrated circuit of the present invention and the contactless type information system including the same are advantageous in that it is possible to extend the reading range between the contactless type information medium (semiconductor integrated circuit) and the reader/ writer, which exchanges data in contactless communications with the contactless type information medium, and in that data can be exchanged stably even if the power supply voltage is lowered when data is returned from the contactless type information medium to the reader/writer. Thus, the present invention is useful as a semiconductor integrated circuit to which power is supplied via electromagnetic waves, and an information system (contactless type information system), etc., including a contactless type information medium, which includes the semiconductor integrated circuit.

The invention claimed is:

1. A semiconductor integrated circuit, to which a power supply voltage is supplied via electromagnetic waves received by an antenna coil, and which exchanges data via the antenna coil, the semiconductor integrated circuit comprising:
   a memory circuit storing data;
   a pair of terminals to which the antenna coil is connected;
   a modulating-transmitting circuit for transmitting data via the antenna coil by varying a load between the terminals according to data to be transmitted;
   a transmission control circuit for outputting data stored in the memory circuit to the modulating-transmitting circuit; and
   a reset signal generating circuit for outputting a reset signal for resetting the transmission control circuit to the transmission control circuit when the power supply voltage decreases below a predetermined threshold value, wherein:
   the transmission control circuit is configured to output a transmission status signal, which indicates that data is being transmitted; and
   the reset signal generating circuit is configured so that the threshold value is lower during a period in which the transmission status signal is being output than during a period in which the transmission status signal is not being output.

2. The semiconductor integrated circuit of claim 1, wherein the reset signal generating circuit includes a voltage-dividing resistor for dividing the power supply voltage and is configured so as to output the reset signal when a voltage obtained by the voltage division by the voltage-dividing resistor is lower than a predetermined reference voltage.

3. The semiconductor integrated circuit of claim 2, wherein the reset signal generating circuit is configured to change a voltage division ratio so that the voltage obtained by the voltage division is higher during a period in which the transmission status signal is being output than during a period in which the transmission status signal is not being output.

4. The semiconductor integrated circuit of claim 3, wherein:
   the voltage-dividing resistor is a series of resistors including three or more resistors; and
   the reset signal generating circuit is configured to change the voltage division ratio by changing the number of resistors of the series of resistors for dividing the power supply voltage.

5. The semiconductor integrated circuit of claim 3, wherein the transmission control circuit is configured to output the transmission status signal while simultaneously outputting data stored in the memory circuit to the modulating-transmitting circuit.

6. The semiconductor integrated circuit of claim 4, wherein the transmission control circuit is configured to output the transmission status signal while simultaneously outputting data stored in the memory circuit to the modulating-transmitting circuit.

7. The semiconductor integrated circuit of claim 2, wherein the transmission control circuit is configured to output the transmission status signal while simultaneously outputting data stored in the memory circuit to the modulating-transmitting circuit.

8. The semiconductor integrated circuit of claim 1, wherein the transmission control circuit is configured to output the transmission status signal while simultaneously outputting data stored in the memory circuit to the modulating-transmitting circuit.

9. The semiconductor integrated circuit of claim 1, wherein the transmission control circuit includes a buffer for holding data stored in the memory circuit and is configured to output data held in the buffer to the modulating-transmitting circuit.

10. The semiconductor integrated circuit of claim 1, wherein the transmission control circuit is configured to stop outputting the transmission status signal after an amount of time greater than or equal to an amount of time required for outputting data to the modulating-transmitting circuit has elapsed since completion of the data output to the modulating-transmitting circuit.

11. The semiconductor integrated circuit of claim 1, further comprising a high-voltage side reset signal generating circuit for outputting, to the transmission control circuit, a reset signal for resetting the transmission control circuit when the power supply voltage exceeds a predetermined threshold value,
   wherein the high-voltage side reset signal generating circuit is configured so that the threshold value is lower during a period in which the transmission status signal is being output than during a period in which the transmission status signal is not being output.

12. The semiconductor integrated circuit of claim 11 wherein the high-voltage side reset signal generating circuit includes a voltage-dividing resistor for dividing the power supply voltage and is configured to output the reset signal when a voltage obtained by the voltage division by the voltage-dividing resistor is higher than a predetermined reference voltage.

13. The semiconductor integrated circuit of claim 12, wherein the high-voltage side reset signal generating circuit is configured to change a voltage division ratio so that the voltage obtained by the voltage division during a period in which the transmission status signal is being output is higher than that during a period in which the transmission status signal is not being output.

14. The semiconductor integrated circuit of claim 13, wherein:
   the voltage-dividing resistor is a series of resistors including three or more resistors; and
   the high-voltage side reset signal generating circuit is configured to change the voltage division ratio by changing the number of resistors of the series of resistors for dividing the power supply voltage.

15. A contactless type information system, comprising:
   a contactless type information medium including the semiconductor integrated circuit of claim 1 and an antenna coil connected to the semiconductor integrated circuit for transmitting/receiving electromagnetic waves; and
   a data transmitting/receiving device for supplying a power supply voltage to, and exchanging data with, the contactless type information medium via electromagnetic waves.

* * * * *